Dec. 19, 1939.        M. MUELLER-CUNRADI ET AL        2,184,164
PRODUCTION OF BUTADIENE FROM 1,3-BUTYLENE GLYCOL
Filed July 20, 1937
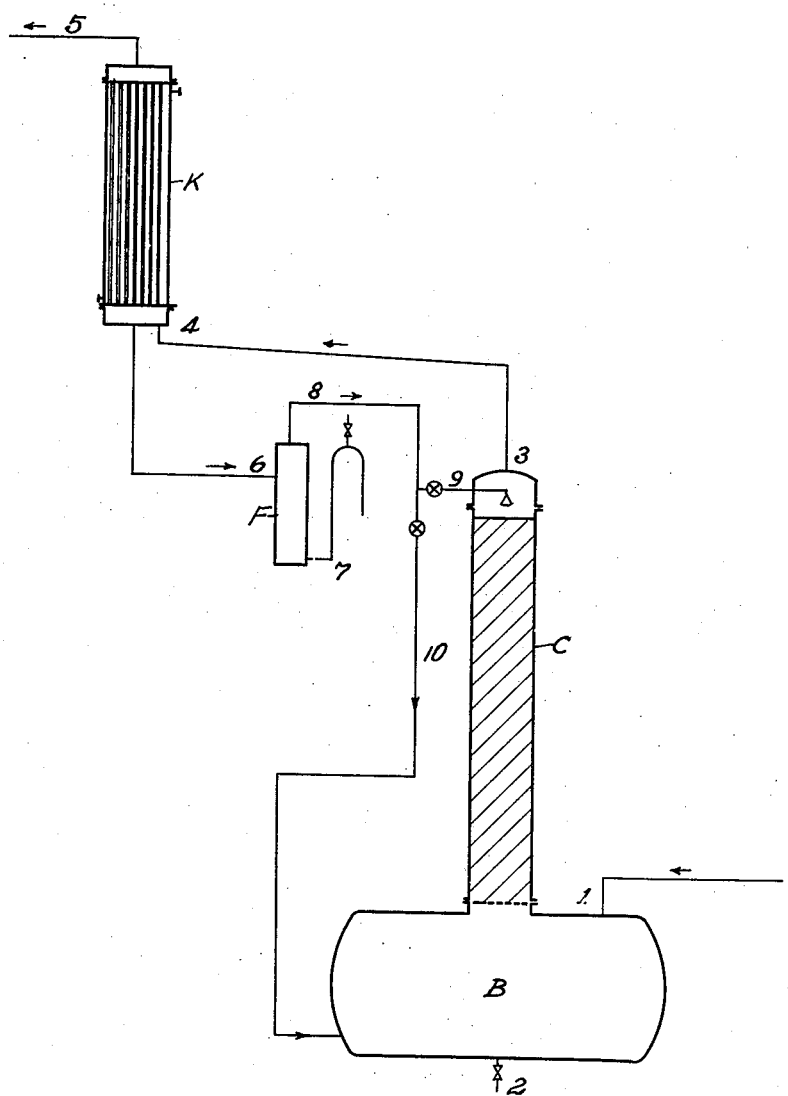
Martin Mueller-Cunradi
Heinz Krekeler
INVENTORS
BY *Kutz and Joslin*
THEIR ATTORNEYS Patented Dec. 19, 1939

2,184,164

UNITED STATES PATENT OFFICE 2,184,164

PRODUCTION OF BUTADIENE FROM 1,3-BUTYLENE GLYCOL

Martin Mueller-Cunradi, Ludwigshafen-on-the-Rhine, and Heinz Krekeler, Mannheim, Germany, assignors to I. G. Farbenindustrie Aktiengesellschaft, Frankfort-on-the-Main, Germany Application July 20, 1937, Serial No. 154,630
In Germany July 24, 1936

2 Claims. (Cl. 260—681)

The present invention relates to an improved process of producing butadiene from 1,3-butylene glycol.

It is already known that hydrocarbons having two conjugated double linkages can be prepared by heating 1,3-glycols with agents splitting off water in such manner that the hydrocarbons are removed from the reaction mixture as rapidly as possible. The process does not give satisfactory yields, however, in the preparation of butadiene from butylene glycol.

We have now found that butadiene can be obtained from butylene glycol by heating in the presence of agents splitting off water in the liquid phase, the yields being very good, by distilling off the reaction products formed, separating therefrom the intermediate products of the splitting off of water and returning them to the reaction chamber in such manner that at least a substantial proportion thereof enters into fractionating exchange with the reaction products distilling off.

The reaction is preferably carried out as follows:

A mixture of 1,3-butylene glycol and an agent promoting the splitting off of water is heated in a distillation still provided with a fractionating apparatus. The mixture of water, butadiene and intermediate products of the splitting off of water distilling off are cooled to room temperature after leaving the fractionating apparatus. There are thus formed two liquid phases, while the butadiene remains gaseous and is recovered separately. The upper layer of the liquid phases, consisting mainly of a mixture of different intermediate products of the splitting off of water, is separated and returned wholly or in a substantial proportion to the fractionating apparatus at the top. This return may be effected continuously or discontinuously. If returning only a substantial proportion, for example a third or the half of the intermediate products to the apparatus the residual proportion may be introduced into the apparatus in the usual manner, i. e. it may be introduced directly into the liquid reaction mixture.

By the said measures, the temperature in the still can be kept at a value sufficient for carrying out the splitting off of water. Furthermore the removal of a part of the agents splitting off water by distillation of the reaction mixture is prevented. Moreover further water is split off from the returned intermediate products so that these are likewise converted into butadiene, whereby a considerable increase in the yield of butadiene is obtained.

Further butylene glycol, which has advantageously been preheated to the reaction temperature or higher, is supplied periodically or continuously to the reaction mixture in amounts corresponding to the amounts distilled off. The amount of butylene glycol capable of conversion in the said manner in a single batch is only limited by the gradual enrichment in the distillation still of by-products incapable of being distilled off at the reaction temperature. After interrupting the supply of butylene glycol, the contents of the still are further heated while gradually increasing the temperature as long as butadiene is still formed. The residue, which is still sufficiently mobile at about 100° C., is then run off from the still.

It is important that a mixture of butylene glycol and agent splitting off water should be present already at the beginning of the splitting off of water. For example, if the butylene glycol be allowed to flow onto the already heated agent for splitting off water, foaming and marked resinification take place From the lower layer of the distillate, which mainly consists of water but which still contains certain amounts of the said intermediate products, the latter may be recovered by fractional distillation and then also returned to the first fractionating apparatus.

As agents splitting off water there may be mentioned in particular organic sulphonic acids. If these contain free mineral acids, the yields are considerably reduced. The sulphonic acids should therefore be free from mineral acids, or the mineral acids contained therein must be neutralized, preferably by the addition of an organic base, as for example aniline. An apparatus suitable for carrying out our process is diagrammatically shown in the accompanying drawing. In the drawing B represents the still. Before beginning the dehydration, butylene glycol together with the agent splitting off water, are introduced through the pipe 1. During the reaction fresh butylene glycol is introduced in the same manner. When the production of butadiene has ceased, the residue formed is drawn off through the stop cock 2. C represents a fractionating column which is provided with filling bodies or bell-shaped condensing surfaces. (These are indicated in the drawing by means of the diagonal lines.) At the upper end of the fractionating column the vapors are drawn off through the pipe 3 and entered at 4 into the cooling device K which is cooled by means of water at normal temperatures. The uncondensed butadiene leaves the cooling device in gaseous form through the pipe 5. The condensate formed in the cooling device flows therefrom through the pipe 6 into a separating vessel F in which two liquid phases are formed. The upper liquid layer is removed from the separating vessel through the pipe 8 and is introduced into the fractionating column C at 9. The lower liquid layer which consists for the most part of water is drawn off from the separating vessel F through the pipe 7. A part of the upper liquid from the separating vessel F may be introduced directly to the still B through the pipe 10. The proportion of said upper liquid thus introduced to the still may be regulated by suitable adjustment of valves (indicated by crosses) in pipes 9 and 10. The following example will further illustrate how our present invention may be carried out in practice, but the invention is not restricted to this example. The parts are by weight.

Example 300 parts of 1,3-butylene glycol, 100 parts of crude naphthalene sulphonic acid containing about 58 per cent of sulphonic acid, 7 per cent of free sulphuric acid and 35 per cent of water, and 15 parts of aniline are heated to boiling in a still provided with a fractionating apparatus. From the beginning of the distillation onwards, further 1500 parts of 1,3-butylene glycol are gradually added. The substances distilled off are condensed in the manner already described, the intermediate products of the splitting off of water separated and returned to the fractionating apparatus.

About 840 parts of very high percentage butadiene are thus obtained in all.

The temperature in the still amounts to from about 150° to 160° C. at the commencement of the splitting off of water, is kept at from about 180° to 190° C. during the supply of the 1,3-butylene glycol and is then gradually raised to from 220° to 240° C.

When using purified toluene sulphonic acid instead of the naphthalene sulphonic acid, the addition of aniline is unnecessary. The yield of butadiene is the same. Benzene sulphonic acid may be used as the agent splitting off water in the same way.

What we claim is:

1. In the production of butadiene by dehydration of 1,3-butylene glycol the steps which comprise heating 1,3-butylene glycol in a still in the liquid phase in the presence of sulphonic acids of aromatic hydrocarbons, distilling off the reaction products formed consisting of butadiene, water and the intermediate products of the dehydration of 1,3-butylene glycol, cooling the distillate to separate the butadiene from the water and said intermediate products, separating the intermediate products from the water and returning them to the still in such manner that they enter into fractionating exchange with the reaction products distilling off.

2. In the production of butadiene by dehydration of 1,3-butylene glycol the steps which comprise heating 1,3-butylene glycol in a still in the liquid phase in the presence of sulphonic acids of aromatic hydrocarbons, distilling off the reaction products formed consisting of butadiene, water and the intermediate products of the dehydration of 1,3-butylene glycol, cooling the distillate to separate the butadiene from the water and said intermediate products, separating the intermediate products from the water and returning at least a substantial proportion of the intermediate products to the still in such a manner that they enter into fractionating exchange with the reaction products distilled off, the residual proportion being introduced directly into the still.

MARTIN MUELLER-CUNRADI.
HEINZ KREKELER.